United States Patent  
Logalbo et al.

(10) Patent No.: US 9,107,215 B2  
(45) Date of Patent: Aug. 11, 2015

(54) SYSTEMS, DEVICES, AND METHODS FOR IMPROVING DATA CAPACITY IN A COMMUNICATIONS SYSTEM BY MANAGING SHORT ADDRESSES

(71) Applicant: MOTOROLA SOLUTIONS, INC, Schaumburg, IL (US)

(72) Inventors: Robert D. Logalbo, Rolling Meadows, IL (US); Sanjay G Desai, Lake in the Hills, IL (US); Leslie G Gustafson, Oakwood Hills, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 133 days.

(21) Appl. No.: 13/945,375

(22) Filed: Jul. 18, 2013

(65) Prior Publication Data

US 2015/0023324 A1 Jan. 22, 2015

(51) Int. Cl.  
*H04J 3/24* (2006.01)  
*H04W 72/04* (2009.01)  
*H04W 74/08* (2009.01)

(52) U.S. Cl.  
CPC ...... *H04W 72/0446* (2013.01); *H04W 74/0833* (2013.01)

(58) Field of Classification Search  
USPC .................................................. 370/310–350  
See application file for complete search history.

(56) References Cited

U.S. PATENT DOCUMENTS

| | | |
|---|---|---|
| 2003/0225994 A1 | 12/2003 | Moniot et al. |
| 2007/0053322 A1* | 3/2007 | Park et al. ............... 370/329 |
| 2007/0161377 A1* | 7/2007 | Kodikara Patabandi et al. ............... 455/450 |
| 2007/0280184 A1* | 12/2007 | Shin et al. ............... 370/338 |
| 2008/0008111 A1 | 1/2008 | Prakash et al. |
| 2008/0291868 A1 | 11/2008 | Prakash et al. |
| 2009/0129362 A1* | 5/2009 | Higuchi et al. ............... 370/343 |
| 2011/0013601 A1* | 1/2011 | Cerasa et al. ............... 370/336 |

FOREIGN PATENT DOCUMENTS

| | | |
|---|---|---|
| WO | 0167676 A2 | 9/2001 |
| WO | 2006008559 A2 | 1/2006 |

* cited by examiner

*Primary Examiner* — Kwang B Yao  
*Assistant Examiner* — Juvena Loo  
(74) *Attorney, Agent, or Firm* — Daniel R. Bestor

(57) ABSTRACT

Systems, devices, and methods of managing short addresses in a wireless communication system include receiving reservation requests on a random access channel from subscriber units at a radio frequency (RF) site such that the reservation requests includes a minimum number of requested time slots for data transmission between a subscriber unit and the RF site, and a subscriber long address. Further, for each of the reservation requests, the RF site selects a subscriber short address for the respective subscriber unit as well as transmitting the selected subscriber short address to the respective subscriber unit on a RF site channel. In addition, the RF site determines a short address transmission schedule for the subscriber units as well as transmitting a schedule message to the subscriber units on a schedule channel such that the schedule provides slot assignments for data transmissions by subscriber units according to their assigned short addresses.

13 Claims, 7 Drawing Sheets

SYSTEMS, DEVICES, AND METHODS FOR IMPROVING DATA CAPACITY IN A COMMUNICATIONS SYSTEM BY MANAGING SHORT ADDRESSES

BACKGROUND OF THE INVENTION

Communication systems use different addressing schemes to identify end point devices in a network. Such end point devices may include two-way radios and mobile telephones, as well as tablet, laptop, and desktop computers. Intermediate devices that are located between end point devices may route data messages to the end point devices based on end point device addresses. In some communication systems, the address for each end point device may be 32 bits or 24 bits long. Further, in these communication systems, the bandwidth or data rate available for data communication may be limited (e.g. 12 kbps/s or lower). Thus, these communication systems may use a short addressing scheme to reduce the signaling overhead for data transmission and to increase data throughput. That is, a temporary short address (e.g. 10 bits long or less) may be assigned to an end point device by an intermediate device. Further, an intermediate device manages the assignment of the temporary short address. However, there is a challenge in the current state of the art to manage the assignment and then the release of the short addresses assigned to end point devices. Such challenges include the intermediate device having a timer that is too long to release the assignment of the short address thereby reducing the number of available short addresses to be assigned to other end point devices. Another challenge is that the timer of the intermediate device is too short in releasing the assignment of the short address thereby wasting bandwidth by having end point devices requesting for short addresses too often. A further challenge may be the timer of the intermediate device and the timer of the end point device are not synchronized. Consequently, the timer of the intermediate device may be shorter than the timer of one end point device such that two end point devices may be assigned the same short address by the intermediate device thereby interfering each other when transmitting data messages to the intermediate device.

Accordingly, there is a need for systems, devices, and methods for improving data capacity in a communication system by managing short addresses.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
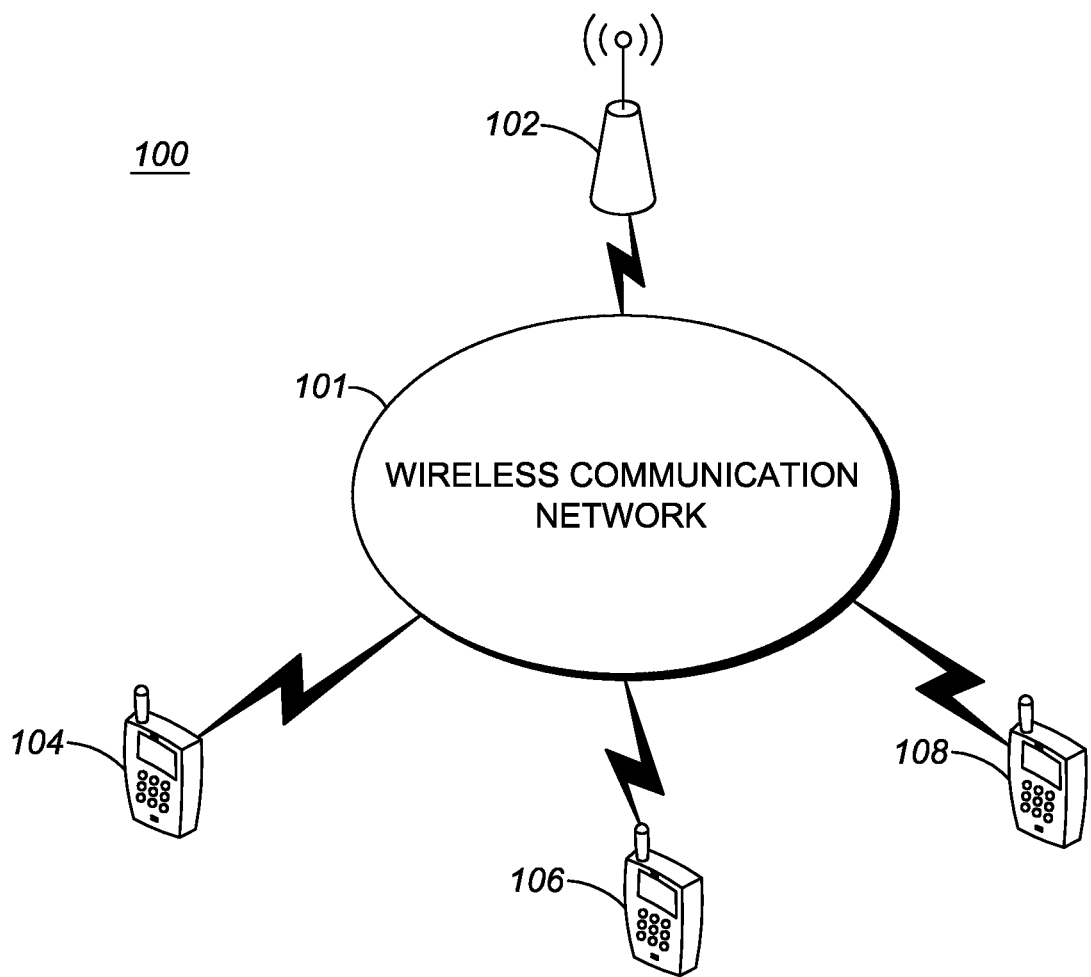
FIG. 1 is a block diagram of wireless communication system managing short addresses for one or more subscriber units in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Systems, devices, and methods of managing short addresses in a wireless communication system are described in the pending disclosure. Some embodiments of wireless systems described herein may be based on modifying systems otherwise operating in accordance with the TIA-102 series of communications standards relating to Land Mobile Communications Radio Standards (APCO Project 25, or P25). Such systems, devices and methods of the present disclosure include receiving a plurality of reservation requests on a random access channel from a respective plurality of subscriber units at a radio frequency (RF) site such that the reservation request includes a minimum number of requested time slots for data transmission between a subscriber unit and the RF site, and a subscriber long address. Further, for each of the plurality of reservation requests, the systems, devices, and methods may include selecting a subscriber short address for the respective subscriber unit from a set of unallocated subscriber short addresses as well as assigning the selected subscriber short address to the subscriber long address by transmitting the selected subscriber short address to the respective subscriber unit on a radio frequency (RF) site channel in a random access acknowledgement. In addition, the systems, methods, and devices includes determining a short address transmission schedule for one or more subscriber units as well as transmitting a short address transmission schedule message to the one or more subscriber units on a schedule channel such that the short address transmission schedule provides a plurality of slot assignments for data transmissions by subscriber units according to their assigned short addresses.

FIG. 1 is a block diagram of wireless communication system 100 managing short addresses for one or more subscriber units in accordance with some embodiments. Such a wireless communication system 100 may include an intermediate device 102 coupled to end point devices (104, 106, 108) over a wireless communication network 101. Intermediate device 102 may be an RF site device such as a base station or any other RF device that is capable of managing short addresses for the subscriber units (104, 106, 108). In some embodiments, an RF site device 102 may be referred to as an RF site that includes such an RF site device 102. In addition, the end point devices (104, 106, 108) may also be called subscriber units (104, 106, 108), which can be mobile devices such as mobile telephones, smartphones, tablet computers, or any other computing device. Further, the RF site device 102 may route data messages from one subscriber unit 104 to another subscriber unit 106. Alternatively, the RF site device 102 may be coupled to the Internet such that the RF site device 102 routes data messages between a subscriber unit (108) and an end point device across the Internet (not shown).

In one embodiment, the wireless communication system 100 may deploy a narrow band, time slotted communication protocol between the RF site device 102 and the one or more subscriber units (104, 106, 108). In such a protocol one of the subscriber units 104 may send an initial reservation request for one or more time slots for data transmission to the RF site device 102. Such an initial reservation request may include a long address of the subscriber unit 104. In response, the RF site device 102 may process the initial reservation request and select a short address for the subscriber unit 104 from a pool or set of unallocated short addresses. Further, the RF site device 102 may send the subscriber unit 104 an acknowledgement of the initial reservation request and provide the subscriber unit 104 with the short address. In addition, the RF site 102 may provide the subscriber unit 104 a schedule message such that lists the short address of each subscriber unit and the corresponding upcoming time slot(s) for which the subscriber unit should transmit data.

In a further embodiment, the subscriber unit 104 may send the initial reservation request to reserve one or more time slots on a random access channel to the RF site device 102. Such a random access channel may employ a carrier sensing multiple access/collision detect (CSMA/CD) protocol as known in the art that allows more than one subscriber unit (104, 106, 108) to request time slots for data transmission over one (random access) channel. Upon transmitting the reservation request, the subscriber unit may set a timer to wait for the acknowledgement from the RF site device 102. If the timer expires before receiving the acknowledgement, then the subscriber unit 104 resends the reservation request to the RF site device 102 on the random access channel. However, the subscriber unit may have a predetermined limit to resend the initial reservation request.

In an additional embodiment, the subscriber unit 104 may send one or more additional reservation requests to request additional time slots on a reservation channel in the wireless communication system 100. Such an additional reservation request is received by the RF site device 102. Further, the RF site device 102 determines a maximum limit of reserved time slots needed by the subscriber unit 104 based on the time slots requested in the one or more reservation requests. In addition, as the RF site device 102 receives data from the subscriber unit 104 on a time slot, the RF site device 102 determines whether the maximum limit of reserved time slots has been reached. If so, the RF site device 102 sends a termination message to the subscriber unit 104 and reassigns the short address for the subscriber unit to the pool or set of unallocated short addresses to be used for other subscriber units in the future. Further, the subscriber unit 104 is notified by the termination message that its assigned short address has expired.

Figure 2:
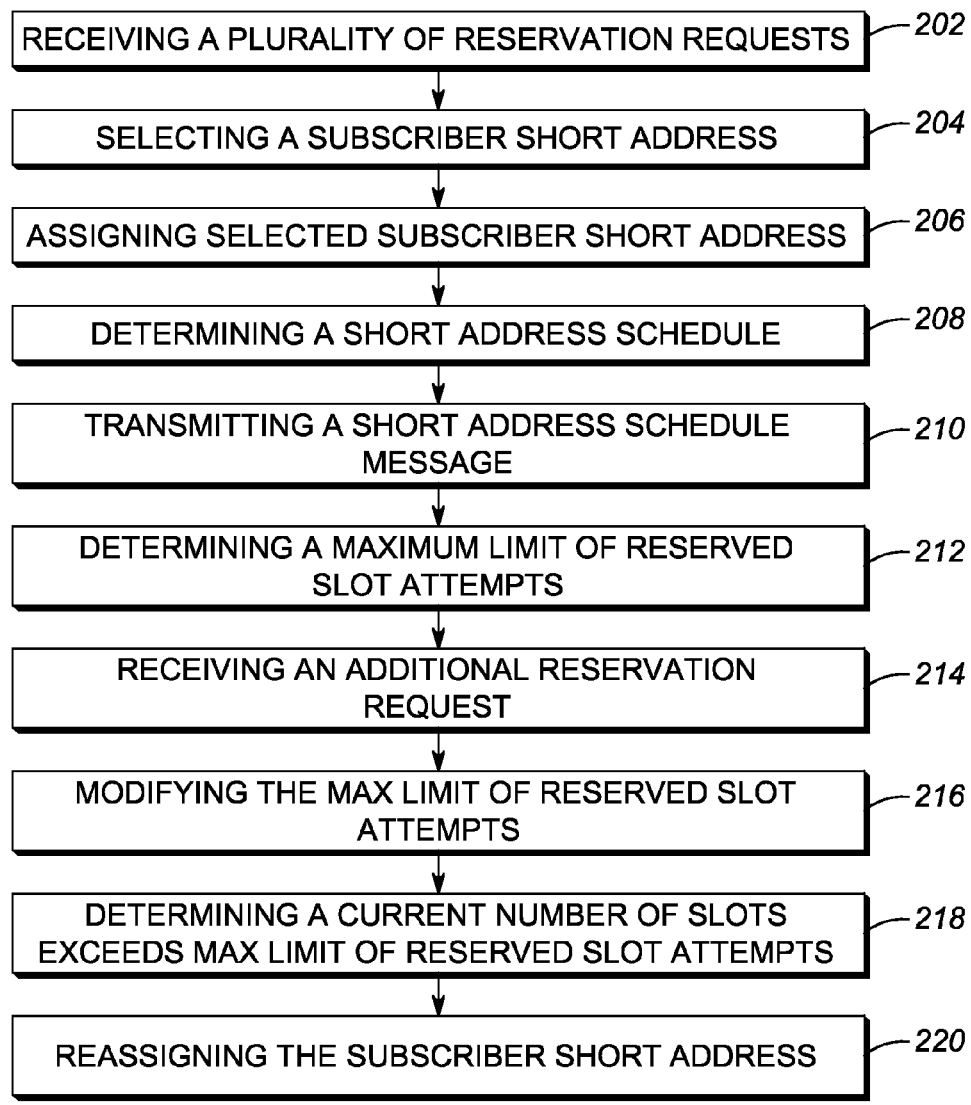
FIGS. 2-3 are flowcharts of methods of managing short addresses for one or more subscriber units in a wireless communication system in accordance with some embodiments.

FIG. 2 is a flowchart of a method 200 of managing short addresses for one or more subscriber units in a wireless communication system in accordance with some embodiments. Such a method 200 may be implemented by an RF site that includes an RF site device that may be the same or similar to RF site device 102. The method 200 includes receiving a plurality of reservation requests on a random access channel from a respective plurality of subscriber units at an RF site, as shown in block 202. Each reservation request includes a minimum number of requested time slots for data transmission between a subscriber unit and the RF site, and a subscriber long address. The random access channel may employ a CSMA/CD protocol to allow more than one subscriber unit to send reservation requests across the random access channel. The method 200 further includes, for each of the plurality of reservation requests, selecting a subscriber short address for the respective subscriber unit from a set of unallocated subscriber short addresses, as shown in block 204. In addition, the method 200 includes assigning the selected subscriber short address to the subscriber long address by transmitting the selected subscriber short address to the respective subscriber unit on a RF site channel in a random access acknowledgement, as shown in block 206. Also, the method 200 includes determining a short address transmission schedule for one or more subscriber units, as shown in block 208. Moreover, the method 200 includes transmitting a short address transmission schedule message to the one or more subscriber units on a schedule channel, as shown in block 210. The short address transmission schedule provides a plurality of slot assignments for data transmissions by subscriber units according to their assigned short addresses. Transmitting a short address transmission schedule message may comprise transmitting a sequence of the assigned short addresses for a corresponding number of slots, and a slot number is determined implicitly by a location of the assigned short address within the sequence.

The method 200 further includes determining a maximum limit of reserved slot attempts that is based on the minimum number of requested slots, as shown in block 212. The maximum limit of reserved slot attempts may be calculated using an algorithm based on the minimum number of requested slots. For example, the maximum limit of reserved slot transmission attempts may be more than the minimum number of requested slots because there may be a data transmission attempt by the subscriber unit on a time slot but the data was not received by the RF site due to interference with the wireless communication network. In such an example, the subscriber unit may have to retransmit the data on another time slot. An example algorithm to determine the maximum limit of reserved slot attempts may be a multiple of the minimum number of requested slots provided in reservation requests by a subscriber unit. Other examples may be functions such as $y1=m1 \times x1+b1$ where x1 is the number of slots requested on the random access channel (as specified by the NumSlotsRequested data field) and y1 is the maximum limit of reserved slot attempts. The variable "m1" may be a function of the long address as different subscribers may have different bandwidth priorities i.e. where one long address is allowed a higher maximum limit of slot attempts than another long address due to subscriber priority. The variable "m1" may also be a function of the total number of reserved slot attempts of all subscribers, allowing less maximum attempts for subsequent subscribers as the total number of reservations requests increase. The y-intercept "b1" is a constant.

In addition, a subscriber unit may have additional data to transmit that cannot be accommodated in time slots requested in previous reservation request(s). Thus, the subscriber unit may send an additional reservation request to the RF site device. Consequently, the method 200 includes receiving an additional reservation request on a reservation channel from the subscriber unit at the RF site device such that the additional reservation request includes a number of slots for data transmission between the subscriber unit and the RF site, as shown in block 214. Also, the method 200 includes modifying the maximum limit of reserved slot attempts based on the number of time slots in the additional reservation request for data transmission, as shown in block 216. One example of modifying the maximum limit of reserved slot attempts after receiving the reservation request on the reservation channel is to add the maximum limit of reserved slot attempts calculated after the request is received on the random access channel (y1) with an additional $y2=m2 \times x2+b2$, where x2 equals the number of slots requested in the reservation request received on the reservation channel (as specified by the NumSlotsRequested data field). In this case $b2>=b1+1$ where the 1 is added back to replace the reservation slot lost on the reservation channel for the reservation request. Therefore the total maximum limit of reserved slots is $y=y1+y2$. Additional $2^{nd}$, $3^{rd}$, etc. reservation request(s) may be received on the reservation channel and the maximum limit would be added to the previous accumulated maximum limit i.e. $y=y1+y2+y3$ where y1 is the maximum limit calculated on the random access channel; y2 calculated as a function of the first reservation request received on the reservation channel; and y3 calculated as a function of the $2^{nd}$ reservation request received on the reservation channel.

The subscriber unit sends data in the time slots indicated by its short address in the schedule message. Further, the RF site device tracks the number of time slots it receives data from the subscriber unit or tracks the time slots of attempted data transmission from the subscriber unit (there may be time slots on which the subscriber unit attempted to send data but was not received by the RF site device due to interference from the wireless communication network). Moreover, the method 200 includes determining that a current number of slots and/or a number of attempts to transmit in assigned slots by the subscriber unit have exceeded the maximum limit of reserved slot attempts, as shown in block 218. In such an event, the method 200 further includes reassigning the subscriber short address from the subscriber unit to the set of unallocated subscriber short addresses, as shown in block 220.

Figure 3:
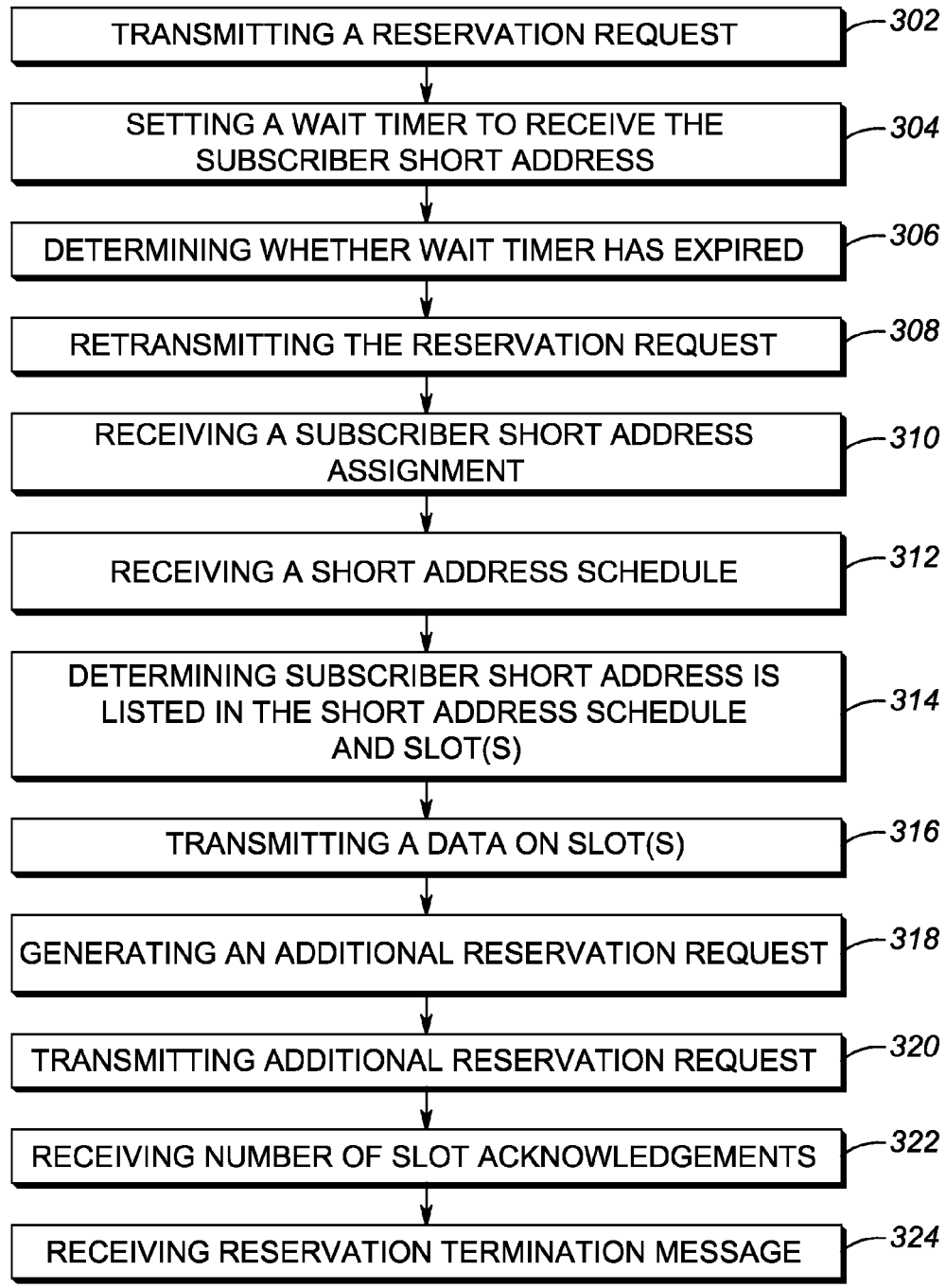

FIG. 3 is a flowchart of a method 300 of managing short addresses for one or more subscriber units in a wireless communication system in accordance with some embodiments. Such a method 300 may be implemented by the subscriber unit that is in communication with an RF site device. The method 300 includes transmitting a reservation request for a subscriber short address, and a minimum number of requested slots for data transmission on a random access channel to a radio frequency (RF) site from a subscriber unit, as shown in block 302. The reservation request may include a subscriber long address. Further, the random access channel may employ a CSMA/CD protocol to allow more than one subscriber unit to send reservation requests across the random access channel. The method 300 further includes setting a wait timer to receive the subscriber short address on the RF site channel, as shown in block 304. In addition, the method 300 includes determining whether the wait timer to receive the subscriber short address has expired, as shown in block 306. The wait timer may have expired before receiving a short address and an acknowledgement of the reservation request. The short address and the acknowledgement may not have been received because there are no unallocated short addresses available to be assigned to the subscriber unit. Alternatively, the data message including the short address and the acknowledgement may have suffered from noise and interference from the wireless communication network and could not be received by the subscriber unit, accordingly. Consequently, the method 300 includes, in some embodiments, retransmitting the reservation request for a short address, and a minimum number of slots for data transmission on the random access channel to the radio frequency (RF) site from the subscriber unit, as shown in block 308. Moreover, the method 300 includes receiving a subscriber short address assignment on a RF site channel by the subscriber unit, as shown in block 310.

The method 300 further includes receiving a short address transmission schedule on a schedule channel, as shown in block 312. In addition, the method 300 includes determining that the subscriber short address is listed in the short address transmission schedule and the one or more slots to transmit data by the subscriber unit corresponding to the subscriber short address, as shown in block 314. Also, the method 300 includes transmitting data from the subscriber unit to the RF site device during the one or more time slots, as shown in block 316.

While transmitting data based on an initial reservation request, the subscriber unit may have additional data to be transmitted to the RF site device as part of the data transmission. The method 300 further includes generating an additional reservation request based on the data transmission, as shown in block 318. In addition, the method 300 includes transmitting the additional reservation request for a short address on a reservation channel, the additional reservation request includes a number of slots for the data transmission, as shown in block 320. Also, the subscriber unit may receive an acknowledgement of the additional reservation request.

Moreover, the method 300 includes receiving a number of slot acknowledgements equal to a total number of reserved slots requested such that data transmission has been received (by the RF site device) and such that the subscriber short address has been reassigned to a set of unallocated short addresses, as shown in block 322. The method 300 further includes receiving a reservation termination message from the RF site on the RF site channel such that the subscriber short address has expired, as shown in block 324.

Persons of ordinary skill in the art would understand that in some embodiments, the different steps of the methods disclosed in FIGS. 2-3 may be implemented in a different order or additional steps may be implemented. Further, some steps of the methods (200 and 300) may not be implemented in some embodiments.

Figure 4:
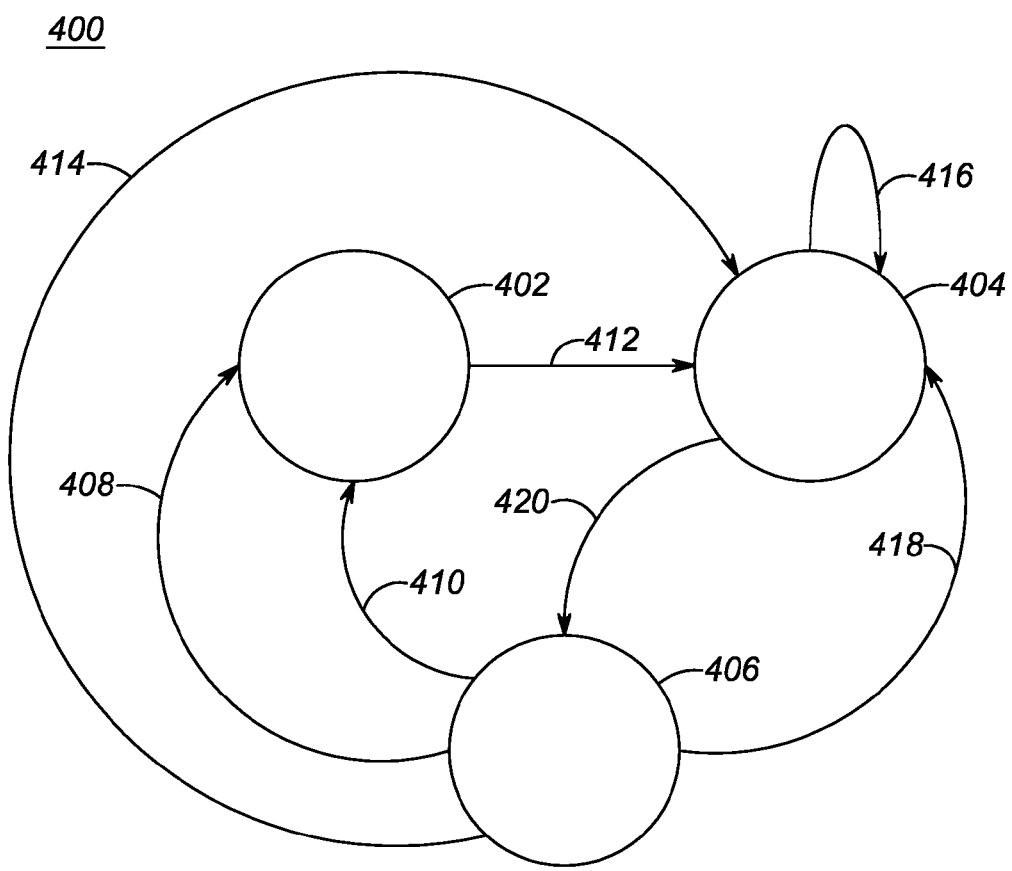
FIGS. 4-5 are state diagrams of managing short addresses for one or more subscriber units in a wireless communication system in accordance with some embodiments.
Figure 5:
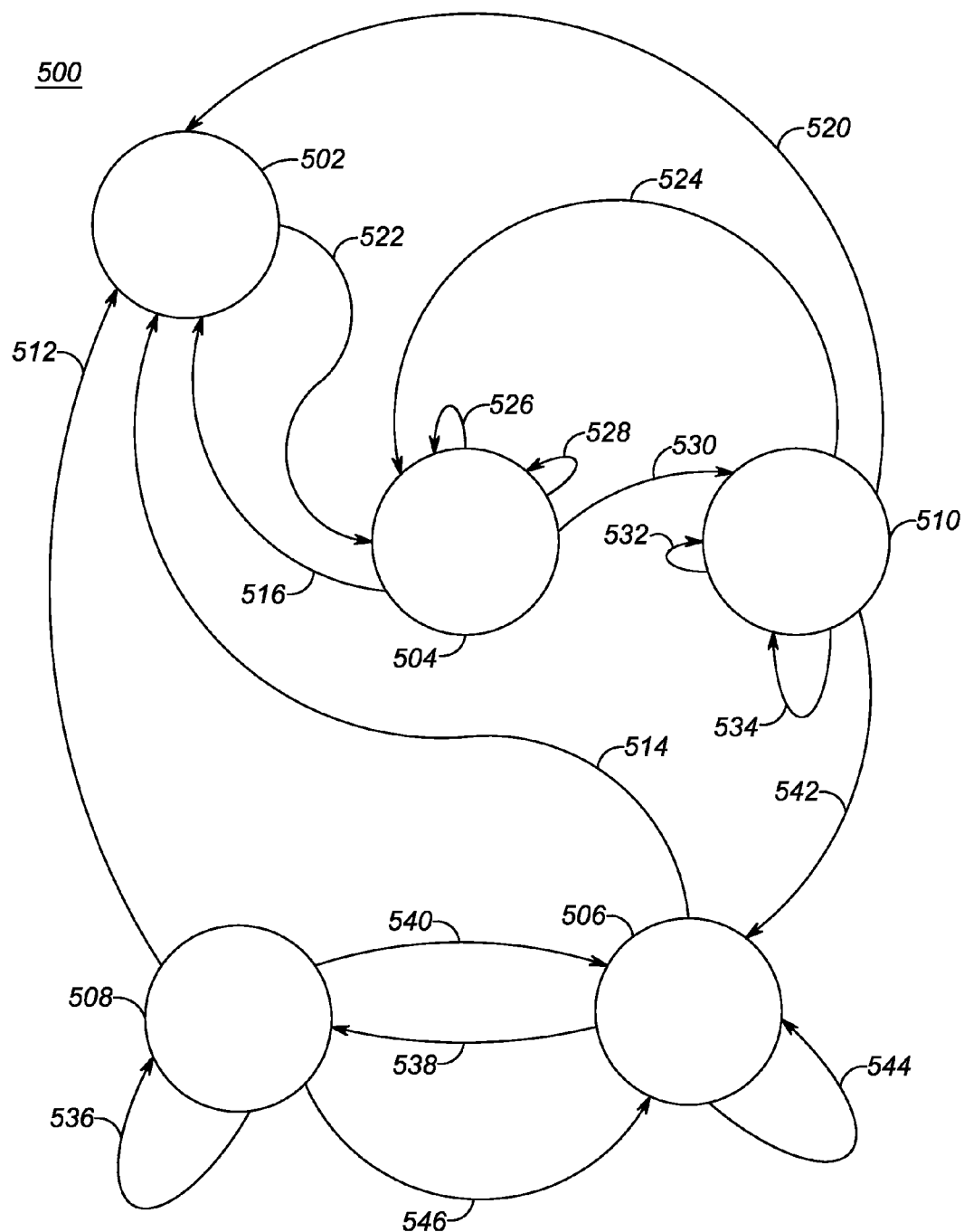

FIGS. 4-5 are state diagrams of managing short addresses for one or more subscriber units in a wireless communication system in accordance with some embodiments. In further embodiments, the subscriber units and RF site devices in such wireless communication systems may employ a protocol layer stack used in data networks. Upper layers of the protocol layer stack include application, transport and network/routing layers. Lower layers may include a datalink layer and physical layer such as media access control protocol and enhanced data capacity (EDC) protocol. Further, the EDC protocol may include a random access channel, RF site channel, a schedule channel, and a reservation channel. A subscriber unit may send an initial reservation request on the random access channel (employing CSMA/CD). Further, the subscriber unit may send additional reservation requests on the reservation channel. An RF site device may send acknowledgements for the reservation requests and the data on an RF site channel.

FIG. 4 is a state diagram 400 directed to the states and state transitions of an RF site device managing short addresses for a subscriber unit. There is one such state machine per subscriber. State 402 is a "no reservation" idle state in which the RF site device has not received reservation requests from the subscriber unit. Thus, there is (yet) no communication between the RF site device and the subscriber unit. State 404 is a "prepare reservation" state in which the RF site device manages the reservation request(s) successfully received from the subscriber unit in conjunction with the RF site scheduler module. State 406 is a "prepare acknowledgement" state. The RF site scheduler module is provided a short address for a subscriber unit and generates a schedule of short addresses of subscriber units and corresponding time slots in which each subscriber unit may transmit data. Further, state 406 provides the RF scheduler module with the number of slots still available for data transmission to the subscriber unit associated with a short address. The maximum limit of reserved slots available to the subscriber unit may be determined based on the sum of the number of slots requested in an initial reservation request made on the random access channel and number of slots requested by additional reservation requests successfully received from the subscriber unit on the reservation channel.

The RF site determines the maximum limit of reserved slots available to the subscriber unit using an algorithm based on (e.g. multiple of) the sum of the number of slots requested by the subscriber unit. Further, the EDC protocol provides for a data field RRNum, which is the ID of the reservation request, and a data field NumSlotsRequested, the value of which is equal to the number of slots requested by the subscriber unit in a reservation request. The sum of the number of slots requested by the subscriber unit may increase only when an additional reservation request is successfully received from the subscriber unit with an RRNum different from the RRNum in a previously received reservation request. State 404 provides state 406 (which manages the sending of acknowledgements) with the RRNum found in the most recently received reservation request.

The state 404 may also assemble the received data (which may be received in data blocks) into datagrams (i.e. Internet Protocol (IP) packets). The identity (ID) of every successfully received data block as well as the identity of the data blocks' datagram is provided to state 406 to be acknowledged. In one embodiment, state 404 and state 406 may share a common data structure (e.g., "stash"), which is the value of the number of reserved slots left for the subscriber unit to transmit data. In one embodiment, state 404 may increase the value of the stash common data structure per rules described in this disclosure. The stash value is initialized with the 'y1' value calculated earlier. The stash is increased by y2, y3, etc. with each successfully received reservation request received on the reservation channel.

Note that all state transitions into state 404 send either an acknowledgement of an initial reservation request received across the random access channel or an acknowledgment of an additional reservation request received across a reservation channel. Note, one embodiment sends the acknowledgements a fixed number of slots away from the reservation request attempt or data transmission attempt by the subscriber unit to decrease the delay variance and increase reliability.

State 406 is the "prepare acknowledgement" state that prepares and manages the acknowledgements in conjunction with the RF site scheduler module. The acknowledgements include both acknowledgements for successfully received data blocks (the block and datagram ID must be acknowledged) and additional reservation requests. Further, state 406 receives the data block IDs, datagram ID, and the RRNum from the most recently received reservation request, and prepares an acknowledgement with these received values. This acknowledgment is then prepared and given to the RF scheduler module. In one embodiment, the prepared acknowledgement is transmitted a fixed number of slots from the end of the last reserved slot assigned to the given subscriber unit to decrease the delay variance and increase reliability.

State 406 may access the common data structure (e.g. stash) shared with state 404, which stores the value of the number of slots still available to the subscriber unit for data transmission. Further, state 406 decrements the value (i.e. the number of slots still available to the subscriber unit) with every failed or successful subscriber unit data transmission attempt.

Further referring to FIG. 4, state transitions 412 (transition from state 402 to state 404), 414 (transition from state 406 to state 404), and 416 (transition from state 404 to state 404), occur during the RF site device receiving a reservation request on the random access channel or a number of slots for data transmission. When receiving the reservation request on the random access channel (not when a reservation request is received on the reservation channel), all states for associated with the subscriber in the state machine are reset. In addition, the RF site device should transmit the RRNum value back to the subscriber unit (preferably a deterministic number of slots from when a random access attempt was made) in an acknowledgement. In one embodiment, the random access reservation request acknowledgment includes the RRNum; the subscriber long ID/address; the subscriber short address. From this information, the subscriber device may determine what short address to which its reservation is assigned. The long address is present because more than one subscriber may have made a reservation attempt on the given random access slot.

State transition 418 (transition from state 406 to state 404) occurs when inbound data and/or a reservation request is successfully received on the reservation channel from one subscriber and a corresponding outbound ACK for the received inbound data and/or reservation request received on the reservation channel is prepared and sent to the given subscriber. All states are reset when a reservation request is received on the random access channel; all states are kept when a reservation request is received on the reservation channel.

State transition 420 (transition from state 404 to state 406) occurs when the subscriber unit has transmitted data on some number of reserved slots less than or equal to the stash value. Thus, a number of data blocks are successfully received from the subscriber unit and possibly an additional reservation request is received from the subscriber unit. The data blocks successfully received by the RF site are assembled into a datagram. Further, the ID of the data blocks and the ID of the blocks' datagram are prepared for acknowledgement to the subscriber unit.

Moreover, if an additional reservation request is received, and if the RRNum in the additional reservation request is different than the RRNum in the previously received reservation request, the newly received RRNum is stored for later access and the previous RRNum is deleted. Further, the stash value is modified based on the NumSlotsRequested value. Also, the RF site device sends an acknowledgement of the received additional reservation request that includes the newly received RRNum back to the subscriber unit.

During state transition 418 (transition from state 406 to state 404) an acknowledgement is prepared for any data blocks and additional reservation requests that were received from the subscriber unit. The prepared acknowledgement is then provided to the RF site scheduler module. State transition 418 assumes that the stash value (current count of remaining reserved slot attempts) for that subscriber unit has not yet been depleted to 0.

During state transition 410 (transition from state 406 to state 402) an acknowledgement is prepared for any data blocks successfully received from the subscriber unit and are provided to the RF site scheduler module. Further, there are no more additional reservation requests that need to be acknowledged to the subscriber unit. The prepared acknowledgement is then provided to the one RF site scheduler module for transmission. State transition 410 assumes that data transmission from the subscriber unit is complete. The RF site then puts the subscriber's short address back into the available pool to be assigned to any subsequent subscriber making a reservation request on the random access channel. The RF site then enters the idle state 402.

During state transition 408 (transition from state 406 to state 402) an acknowledgement is prepared for any data blocks successfully received from the subscriber unit and provided to the RF site scheduler module. Further, there are no additional reservation requests that need be acknowledged to the subscriber unit. The prepared acknowledgement is then provided to the RF site scheduler module. State transition 408 assumes that the subscriber unit has exceeded the maximum limit of reserved slots for data transmission. That is: Stash<=0.

Upon exceeding the maximum limit of reserved slots for data transmission, the RF site deletes any incompletely assembled datagrams. The RF site then puts the subscriber's short address back into the available pool to be assigned to any subsequent subscriber making a reservation request on the random access channel. Further, the RF site channel enters the idle state 402.

FIG. 5 is a state diagram 500 of managing short addresses for one or more subscriber units in a wireless communication system in accordance with some embodiments. State diagram 500 is directed to the states and state transitions of a subscriber unit communicating with an RF site device managing short addresses for a subscriber unit. State 502 is the idle state of the subscriber unit. The subscriber media access control (MAC) layer (a data link layer) has no packets to send to the RF site device. State 504 is the "wait for random access channel" state. That is, the subscriber unit MAC layer has been delivered data from the upper layers of the subscriber unit protocol stack. The subscriber unit intends to wait and find an inbound random access channel opportunity to request inbound reserved slots to deliver the data. State 506 is the "wait for reservation announcement" state, which is the schedule with the given subscriber's short address. That is, the subscriber MAC layer has received an acknowledgement from the RF site device that the reservation request sent on the random access channel was successfully received and the subscriber unit is now waiting for a reservation announcement from the RF site device. State 508 is a "wait for acknowledgement for data" state. That is, the subscriber unit has attempted to deliver data to the RF site device on reserved slots and is now waiting for acknowledgement of successful reception by the RF site device. State 510 is a "wait for random access confirmation" state. That is, the subscriber unit MAC layer has made an attempt to send a reservation request on the random access channel and is waiting for confirmation from the RF site device whether such an attempt has been successfully received by the RF site device.

Transition 522 (transition from state 502 to 504) occurs when data arrives from the upper layers to the MAC layer to be transmitted to the RF site. The subscriber unit may prepare a reservation request. The random access reservation request may include: RRNum, NumSlotsRequested, subscriber's long ID. Further, a retry counter (the number of times the subscriber unit can retransmit the initial reservation request if not received by the RF site device) for the reservation request, RARetryCount for this RRNum is initialized to 0. In addition a timer directed to waiting for a random access slot (opportunity) to send a reservation request (e.g. WaitForRATimer) is initialized and started.

Transition 516 (transition from state 504 to state 502) occurs if the WaitForRATimer expires. That is, there is no random access slot (opportunity) for the subscriber unit to send the reservation request on the random access channel. Further, the subscriber unit releases the RRNum value and abandons the sending of the data ascribed to that RRNum. In addition, the subscriber unit releases the use of a PacketNum parameter associated with the data corresponding to the RRNum value. The subscriber unit may consider using the EDC protocol for some service other than data (e.g. voice transmission over data transmission) because the random access channel may be flooded with communication from other subscriber units thereby having no available random access slot for data transmission.

State transition 530 (transition from state 504 to state 506) occurs when a random access slot arrives for the subscriber unit to send an initial reservation request. As may be the case in transmitting on random access channels employing CSMA/CD, a backoff may need to be applied before actually transmitting the initial reservation request on such a slot. Further, the subscriber unit transmits the initial reservation request that includes the RRNum value and NumSlotsRequested value on the random access slot. The WaitForRA-Timer is cleared and the timer associated with receiving an acknowledgement of the initial reservation request, WaitForRAConfirmationTimer, is initialized and started.

State transition 528 (transition from state 504 to state 504) occurs if the subscriber MAC layer receives additional data from the upper layers while waiting in state 504 (the "wait for random access channel state"). During such a state transition, the subscriber unit increases the NumSlotsRequested value by the number of slots required to transmit newly received data by the MAC layer.

State transition 524 (transition from state 510 to state 504) occurs when the WaitForRAConfirmationTimer has expired but the RARetryLimit has not been exceed. This occurs when no reservation request acknowledgment was received by the subscriber after the random access channel attempt. Thus, the subscriber unit transition to state 504 to wait for another random access channel slot to retransmit the initial reservation request.

State transition 520 (transition from state 510 to state 502) occurs when the RARetryLimit has been exceeded and the WaitForRAConfirmationTimer has expired without the subscriber unit receiving at least one random access channel acknowledgement of its initial reservation request. The random access channel may be considered unusable either due to poor link margin on the inbound (to the RF site) random access channel and/or poor link margin on the outbound (from the RF site) random access confirmation channel. In either case, the inbound random access and/or outbound random access confirmation channel combination is performing poorly enough to inhibit the subscriber's ability to make a reservation. During state transition 520, the subscriber unit should abandon the sending the initial reservation request, release the RRNum used for the initial reservation request and abandon all data waiting to be sent inbound which were ascribed to the RRNum. Further, the subscriber unit should release the user of a PacketNum married to the data which are to be sent inbound with the given RRNum.

State transition 534 (transition from state 510 to state 510) occurs if the subscriber unit MAC layer receives additional data from its upper layers while waiting in state 510 ("wait for random access confirmation"). During state transition 534, the subscriber unit shall determine an unused RRNum value (a second RRNum value if a second RRNum value has not been determined already—not the RRNum value that was transmitted on the RA slot) and increase the NumSlotsRequested value by the number of slots required to transmit the newly received data by the MAC layer (can be increased from the initial value 0 if this is the first set of data arriving for the second RRNum value).

State transition 542 (transition from state 510 to state 506) occurs when a random access acknowledgement is received by the subscriber unit from the RF site device. The random access acknowledgement (ack) may include: a random access acknowledgement indicator (indicating that the outbound slot is a random access reservation request ack); the subscriber long address; the subscriber's short address. From this information the subscriber device may determine the short address assigned to its reservation. During state transition 542, the WaitForRAConfirmationTimer is cleared and the RRNum in the initial reservation request sent on the random access slot is made available for a subsequent reservation attempt. When the subscriber needs a new RRNum, the subscriber may use a different RRNum than the one ascribed to the last reservation request ack successfully received from the RF site. In some embodiments, the RRNum uses the values 0 and 1. When the subscriber receives a reservation request ack for RRNum=0, it then uses RRNum=1 in its reservation requests until it receives an ack. In this embodiment, if the RF site sees the same RRNum, sequentially, the RF site may assume the subscriber did not receive the reservation request ack and the subscriber is attempting the same reservation request. By the subscriber toggling its RRNum value between the two values (0 and 1) after successfully receiving an ack message, the RF site may distinguish between a repeated request and an additional request. Further, a timer associated with waiting for the reservation confirmation (e.g. with the short address assigned to the subscriber unit), the WaitForReservationTimer, is initialized and started.

State transition 514 (transition from state 506 to state 502) occurs when the WaitForReservationTimer expires before the subscriber has successfully delivered all inbound data. Further, the subscriber unit resets all parameters assigned to the data (i.e. PacketNums) that were ascribed to the RRNum in the reservation request acknowledged by the RF site.

The events which may cause WaitForReservationTimer expiration may include that the maximum limit of reserved slot determined by the RF site device for the subscriber was exceeded before the subscriber successfully delivered all data to the RF site device (i.e. at least before the subscriber received acknowledgements for all the data which the subscriber intended to send to the RF site device—in one embodiment, the RF site device may have received all the data but the subscriber unit did not receive the corresponding acknowledgements). In addition, the WaitForReservationTimer may have expired because the schedule message that includes the reservation announcement may have never been received by the subscriber unit.

State transition 544 (transition from state 506 to state 506) occurs if the subscriber MAC layer receives data from the upper layers while waiting in state 506 ("wait for reservation announcement"). During state transition 544, the subscriber unit determines an unsent RRNum value (an RRNum value which has not been attempted to be sent in a previous reservation request) and increases the NumSlotsRequested value by the number of slots required to transmit the newly received data by the MAC layer (can be increased from 0 if this is a newly created RRNum value).

State transition 538 (transition from state 508 to state 506) occurs when the subscriber unit successfully receives the reservation announcement from the RF site. During state transition 538, the subscriber unit transmits data, not positively acknowledged, but associated with the initial reservation request sent on the random access channel and/or data associated with acknowledged additional reservation requests sent since the last successful random access attempt as well as reservation requests not previously acknowledged (i.e. RRNum values associated with NumSlotsRequested value).

State transition 546 (transition from state 508 to state 506) occurs when acknowledgements were not received for transmitted data and/or reservation requests. The subscriber unit, on the next subsequent reserved slot that is received (before the subscriber enters the idle state 502), retransmits the same data and reservation request which were previously attempted.

State transition 536 (transition from state 508 to state 508) occurs if the subscriber MAC layer receives additional data from the upper layers while waiting in state 508 ("wait for acknowledgement(s)"), the subscriber unit determines an unsent RRNum value (an RRNum value which has not been sent in a reservation request on a reserved slot) and an increase the NumSlotsRequested value by the number of slots required to transmit he newly received data by the MAC layer (can be increased from 0 if this is a newly created RRNum).

State transition 540 (transition from state 508 to state 506) occurs when the subscriber successfully receives acknowledgement(s) from the RF site stating which of the combination of data and additional reservation requests were successfully received by the RF site from the subscriber unit. Further, not all of the data blocks nor the additional reservation request have been successfully received by the RF site. The subscriber unit updates its internal data structures so that remaining data may be transmitted in future reserved slots.

State transition 512 (transition from state 508 to state 502) occurs when one of the following events has occurred: (1) All data has been successfully delivered to the RF site according to the final acknowledgement received from the RF site channel for all reservation requests made, both the one reservation request sent on the random access slot and any additional reservation requests sent on the reservation channel; (2) The RF site device has acknowledged that the reservation has been terminated; (3) All data sent by the subscriber unit did not require acknowledgements, but was sent on reserved slots and the reservation is therefore completed. When one of these events occurs, the RF site device may also enter the idle state, clear all RRNum values and PacketNum values and put the subscriber's short address back into the available pool to be assigned to any subsequent subscriber making a reservation request on the random access channel.

State transition 526 (transition from state 504 back to state 504) and state transition 532 (transition from state 510 back to state 510) occurs if a reservation announcement and/or reserved slot acknowledgement is received while waiting for a random access slot to transmit an initial reservation request (state 504) or waiting for an random access acknowledgment after transmitting the initial reservation request on the random access channel (state 510). Thus, the subscriber unit may ignore the reservation announcement and/or reserved slot acknowledgement. This type of state transition can be also be implemented by the other states.

Figure 6:
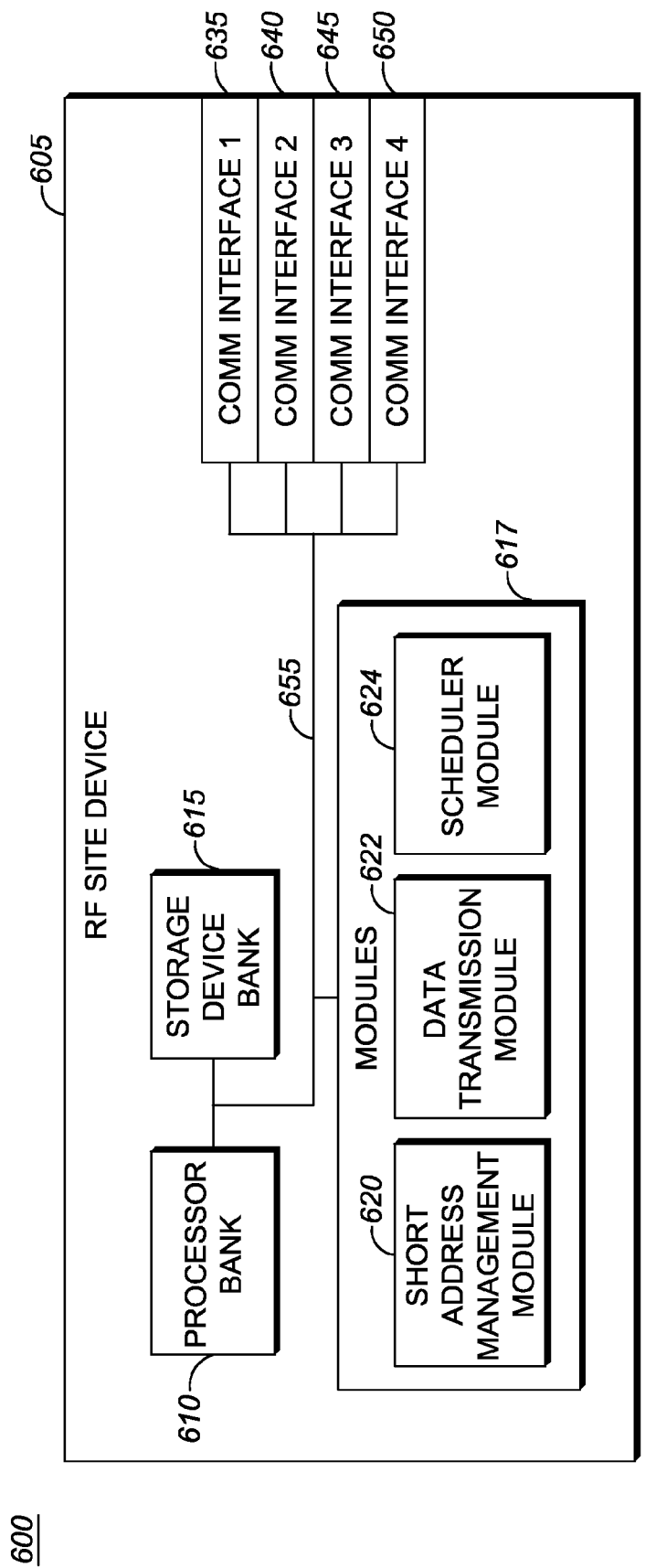
FIG. 6 is a block diagram of an RF site device that is part of a wireless communication system managing short addresses for one or more subscriber units in accordance with some embodiments.

FIG. 6 is a block diagram of an RF site device 605 that is part of a wireless communication system managing short addresses for one or more subscriber units in accordance with some embodiments. Such an RF site device 605 may be used in a network shown in FIG. 1 and be computing device such as a base station. The RF site device 605 may include several different components such as a processor bank 610, storage device bank 615, one or more modules 617, and one or more communication interfaces (635-650). The processor bank 610 may include one or more processors that may be co-located with each other or may be located in different parts of the RF site 605. The storage device bank 615 may include one or more storage devices. Types of storage devices may include memory devices, electronic memory, optical memory, and removable storage media. The one or more modules 617 may include a short address management module 620, a data transmission module 622, and a scheduler module 624. The modules 617 may embody program code executable by the one or more processors in the processor bank 610 for performing the corresponding steps set forth in one or more of the steps of FIGS. 2-5.

The data transmission module 622 receives reservation requests and data from one or more subscriber units and sends acknowledgements of receipt of such reservation requests and data in accordance to the present disclosure. An initial reservation request may be received on a random access channel from a subscriber unit. Such an initial reservation request may be received by the RF site device 605 over one of the communication interfaces (635-650) and then forwarded to the data transmission module 622 for further processing. In addition, additional reservation requests may be received on a reservation channel by the RF site device 605 over one of the communication interfaces (635-650) and then forwarded to the data transmission module 622 for further processing.

The initial reservation request may include the long address of the subscriber unit as well as a request for a number of slots for data transmission. The long address and the number of slots requested for data transmission are forwarded to the short address management module 620 by the data transmission module 622 for further processing. For each additional reservation request, the data transmission module 622 may receive a request for an additional number of slots for data transmission from the subscriber unit. The data transmission module 622 may forward the request for additional number of slots for data transmission to the short address management module 620 for further processing.

The short address management module 620 may receive the long address for a subscriber unit and the requested number of slots for data transmission. Further, the short address management module 620 may select a short address from a set of unallocated short addresses and assign such short address to the subscriber unit. Further, the short address is forwarded to the scheduler module 624 for transmission to the subscriber unit.

In addition, the short address management module may determine a maximum limit of reserved slots for the subscriber unit associated with the newly assigned short address. Such a maximum limit of reserved slots may based on (e.g. multiple of) the number of slots requested by the subscriber unit in the initial reservation request. Moreover, if additional reservation requests are received by the RF site 605, then the maximum limit of reserved slots is updated based on (e.g. multiple of) the number of slots requested in the additional reservation requests.

The short address management module 620 tracks the number of slots used (i.e. data sent on the reserved slots or data should have been attempted to be sent on the reserved slots) by the subscriber unit. When the number of slots exceed the maximum limit of reserved slots, the short address management module 620 causes a termination message to be generated and sent to the subscriber unit to notify that the short address is no longer assigned to the subscriber unit. Further, the short address management module 620 may then reassign the short address from the subscriber unit to the set of unallocated short addresses.

The scheduler module 624 receives the short address assigned to the subscriber unit from the short address management module. Further, the scheduler module generates a schedule message to be sent to the subscriber unit on a schedule channel. The schedule message lists the short address of one or more subscriber unit and the one or more time slot(s) assigned to each subscriber unit for data transmission. Such a schedule message is generated and sent periodically to the subscriber unit is that the subscriber unit can complete its data transmission.

Each of the communication interfaces (635-650) may be software or hardware associated in communicating to other devices. The communication interfaces (635-650) may be of different types that include a user interface, USB, Ethernet, WiFi, P25, DMR, TETRA, wireless, optical, cellular, or any other communication interface coupled to communication network. One or more of the communication interface (635-650) may be or coupled to a user interface known in the art. Further, the communication interfaces (635, 640, 645, 650) may be used by modules 617 and the any other part of the subscriber unit device 605 to receive and send data and messages to other devices including one or more subscriber units.

An intra-device communication link 655 between the processor bank 610, storage device bank 615, modules 617, and communication interfaces (635, 640, 645, 650) may be one of several types that include a bus or other communication mechanism.

Figure 7:
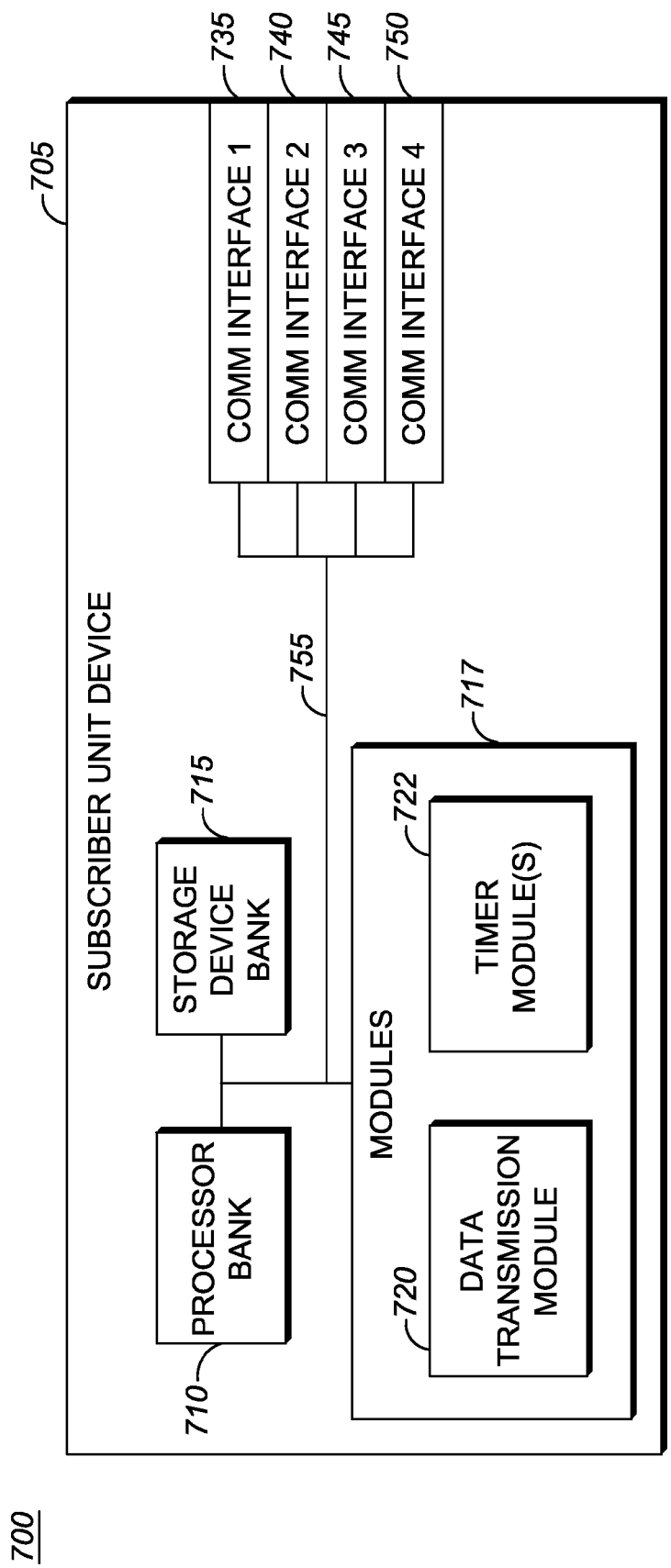
FIG. 7 is a block diagram of a subscriber unit device that is part of a wireless communication system managing short addresses for one or more subscriber units in accordance with some embodiments.

FIG. 7 is a block diagram of a subscriber unit device 705 that is part of a wireless communication system managing short addresses for one or more subscriber units in accordance with some embodiments. Such a subscriber unit device 705 may be used in the network shown in FIG. 1. The subscriber unit device 705 may include several different components such as a processor bank 710, storage device bank 715, one or more modules 717, and one or more communication interfaces (735, 740, 745, 750). The processor bank 710 may include one or more processors that may be co-located with each other or may be located in different parts of the subscriber unit 705. The storage device bank 715 may include one or more storage devices. Types of storage devices may include memory devices, electronic memory, optical memory, and removable storage media. The one or more modules 717 may include a data transmission module 720 and one or more timer modules 722. The one or more modules 717 may embody program code executable by the one or more processors in the processor bank 710 for performing the corresponding steps set forth in one or more of the steps of FIGS. 2-5.

The data transmission module 720 may be used to send data to and receive acknowledgement and schedule messages from a RF site device. Further, the data transmission module 720 may be used to receive data from the upper layers of subscriber unit protocol layer stack (e.g. application layer, transport layer, network layer, etc.) to be sent to the RF site device. In one embodiment, the data transmission module 720 may generate an initial reservation request that includes the subscriber unit device long address and a number of slots requested for data transmission. Such an initial reservation request is sent on a random access channel between the subscriber unit device 705 and the RF site employing CSMA/CD.

The data transmission module 720 may forward the initial reservation request to one of the communication interfaces (735-750) to be sent on the random access channel to the RF site device. Further, the data transmission module 820 may trigger a timer managed by the timer modules 722 (e.g. WaitRATimer) to monitor whether the subscriber unit device 705 has access to a slot (e.g. opportunity) to send the initial reservation request to the RF site on the random access channel. If such a timer expires before the subscriber unit device 705 can send the initial reservation request on the random access channel, then the subscriber unit device 705 may abandon sending any data at this time and consider employing a different service (e.g. voice transmission over data transmission) because the random access channel is not available.

If the initial reservation request is sent on the random access channel, the data transmission module 720 may trigger another timer managed by the timer modules 722 (e.g. WaitRAConfirmationTimer) to monitor whether the subscriber unit device 705 has received an acknowledgement from the RF site device that the RF site device has received the initial reservation request. Such an acknowledgement may include the short address assigned to the subscriber unit.

Further, the subscriber unit device 705 may receive schedule messages on a schedule channel through one of the communication interfaces (735-750). The schedule message lists the short addresses of subscriber units and the corresponding slot(s) for each subscriber unit to transmit data. If the short address is listed in the schedule message then the data transmission module 720 sends the data received from the upper layers of the subscriber unit device's protocol stack on the corresponding slot(s).

If the timer (e.g. WaitRAConfirmationTimer) expires before the subscriber unit device 705 receives an acknowledgement of the initial reservation request, then the subscriber unit device 705 may resend the initial reservation request on the random access channel. Further, there may be a limit (managed by a counter, e.g. RARetryCount) on the number of times the subscriber unit device 705 may resend the initial reservation request. If the number of times for retransmission of the initial reservation requests exceeds such counter, the subscriber unit device 705 may abandon sending the initial reservation request because the random access channel or the channel by which the subscriber unit device 705 receives acknowledgement is poor in quality (e.g. too much interference).

Moreover, if the data transmission module 720 receives additional data from the upper layers of the subscriber unit device protocol stack after sending a reservation request, then the data transmission module 720 may generate and the subscriber unit device 720 may send an additional reservation request on a reservation channel to the RF site device. Such an additional reservation request includes a number of additional slots requested to transmit the additional data.

Also, the data transmission module 720 may receive the a termination message from the RF site, signaling that the short address for the subscriber unit device has been reassigned to a set of unallocated short addresses, thereby terminating data transmission by the subscriber unit device 705. This may be due to the subscriber unit device 705 has transmitted and/or received acknowledgement of all the data for the data transmission. Alternatively, the subscriber unit device 705 may have exceeded the maximum limit of reserved slots as determined by the RF site device before completing data transmission. If so, the subscriber unit device 705 may attempt to send another initial reservation request on the random access channel to complete the data transmission Each of the communication interfaces (735-850) may be software or hardware associated in communicating to other devices. The communication interfaces (735-750) may be of different types that include a user interface, USB, Ethernet, WiFi, P25, DMR, TETRA, wireless, optical, cellular, or any other communication interface coupled to communication network. One or more of the communication interface (735-750) may be or coupled to a user interface known in the art. Further, the communication interfaces (735-750) may be used by modules 717 and the any other part of the subscriber unit device 705 to receive and send data and messages to other devices including an RF site device.

An intra-device communication link 755 between the processor bank 710, storage device bank 715, modules 717, and communication interfaces (730-745) may be one of several types that include a bus or other communication mechanism.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method for managing allocation of short addresses to improve data capacity in a communication system, the method comprising:
 receiving, at a radio frequency (RF) site device, a plurality of reservation requests on a random access channel from a respective plurality of subscriber units at a RF site wherein each reservation request includes a subscriber long address for identifying the respective subscriber unit and a minimum number of requested time slots for data transmission between a respective subscriber unit and the RF site, and for each of the received reservation requests:
  selecting, by the RF site device, a subscriber short address for each respective subscriber unit from a set of unallocated subscriber short addresses for identifying the respective subscriber unit; and
  assigning, by the RF site device, each selected subscriber short address to the respective subscriber long address and transmitting the selected subscriber short address to the respective subscriber unit on a radio frequency (RF) site channel in a random access acknowledgement;
 determining, by the RF site device, a short address transmission schedule for the one or more subscriber units, wherein the short address transmission schedule provides a plurality of slot assignments for data transmissions by the one or more subscriber units according to their respective assigned short addresses;
 transmitting, by the RF site device, a short address transmission schedule message including the short address transmission schedule to the one or more subscriber units on a schedule channel;
 determining, by the RF site device, a maximum limit of reserved slot attempts based on the minimum number of requested slots;
 determining, by the RF site device, that a current number of slots and/or a number of attempts to transmit in assigned slots by a particular subscriber unit out of the plurality of subscriber units have exceeded the maximum limit of reserved slot attempts; and
 reassigning, by the RF site device, the corresponding subscriber short address from the particular subscriber unit to the set of unallocated subscriber short addresses.
2. The method of claim 1, wherein transmitting the short address transmission schedule message comprises transmitting a sequence of the assigned short address and a corre- sponding number of assigned slots, and wherein an assigned slot number is determined by a location of the assigned short address within the sequence.

3. The method of claim 1, further comprising, prior to determining that the current number of slots and/or the number of attempts to transmit in assigned slots by the particular subscriber unit out of the plurality of subscriber units have exceeded the maximum limit of reserved slot attempts:
receiving, by the RF site device, an additional reservation request on a reservation channel from the particular subscriber unit at the RF site, wherein the additional reservation request includes a number of slots for data transmission between the particular subscriber unit and the RF site; and
modifying, by the RF site device, the maximum limit of reserved slot attempts based on the number of time slots in the additional reservation request for data transmission.

4. A method for using short addresses to improve data capacity in a communication system, comprising:
transmitting, by a subscriber unit, a reservation request for a subscriber short address, and a minimum number of requested slots for data transmission on a random access channel to a radio frequency (RF) site device at an RF site wherein the reservation request includes a subscriber long address for identifying the subscriber unit;
receiving, by the subscriber unit, a subscriber short address assignment for identifying the subscriber unit on a RF site channel;
receiving, by the subscriber unit, a short address transmission schedule on a schedule channel;
determining, by the subscriber unit, that the assigned subscriber short address is listed in the short address transmission schedule and the one or more slots to transmit data by the subscriber unit corresponding to the assigned subscriber short address;
transmitting, by the subscriber unit, data to the RF site during the one or more determined time slot;
receiving, by the subscriber unit, a notification from the RF site device that a current number of slots and/or a number of attempts to transmit in assigned slots by the subscriber unit have exceeded a maximum limit of reserved slot attempts and that the assigned subscriber short address has been reassigned to a set of unallocated subscriber short addresses; and
responsive to receiving the notification, refraining, by the subscriber unit, from further transmitting data from the subscriber unit to the RF site using the assigned subscriber short address.

5. The method of claim 4, further comprising:
setting a wait timer to receive the subscriber short address on the RF site channel;
determining whether the wait timer to receive the subscriber short address has expired;
retransmitting the reservation request for a short address, and a minimum number of slots for data transmission on the random access channel to the RF site from the subscriber unit.

6. The method of claim 4, further comprising:
generating an additional reservation request based on the data transmission;
transmitting the additional reservation request for a short address on a reservation channel, the additional reservation request includes a number of slots for the data transmission;
receiving an acknowledgement of the additional reservation request.

7. The method of claim 4, further comprising receiving a number of slot acknowledgements equal to a total number of reserved slots requested such that data transmission has been received.

8. A radio frequency (RF) site device for managing allocation of short addresses to improve data capacity in a communication system, the device comprising one or more processors configured to:
receive a plurality of reservation requests on a random access channel from a respective plurality of subscriber units at a RF site wherein each reservation request includes a subscriber long address for identifying the respective subscriber unit and a minimum number of requested time slots for data transmission between a respective subscriber unit and the RF site, and for each of the received reservation requests:
select a subscriber short address for each respective subscriber unit from a set of unallocated subscriber short addresses for identifying the respective subscriber unit; and
assign each respective subscriber short address to the respective subscriber long address and transmit the subscriber short address to the respective subscriber unit on a RF site channel in a random access acknowledgement;
determine a short address transmission schedule for the one or more subscriber units, wherein the short address transmission schedule provides a plurality of slot assignments for data transmissions by the one or more subscriber units according to their respective assigned short addresses;
transmit a short address transmission schedule message including the short address transmission schedule to the one or more subscriber units on a schedule channel;
determine a maximum limit of reserved slot attempts based on the minimum number of requested slots;
determine that a current number of slots and/or a number of attempts to transmit in assigned slots by a particular subscriber unit out of the plurality of subscriber units have exceeded the maximum limit of reserved slot attempts; and
reassign the corresponding subscriber short address from the particular subscriber unit to the set of unallocated subscriber short addresses.

9. The device of claim 8, wherein the device is further configured to transmit a sequence of the assigned short addresses and a corresponding number of assigned slots, and wherein an assigned slot number is determined by a location of the assigned short address within the sequence.

10. The device of claim 8, wherein the device is further configured to, prior to determining that the current number of slots and/or the number of attempts to transmit in assigned slots by the particular subscriber unit out of the plurality of subscriber units have exceeded the maximum limit of reserved slot attempts:
receive an additional reservation request on a reservation channel from the particular subscriber unit at the RF site, wherein the additional reservation request includes a number of slots for data transmission between the particular subscriber unit and the RF site; and
modify the maximum limit of reserved slot attempts based on the number of time slots in the additional reservation request for data transmission.

11. A subscriber unit device for using short addresses to improve data capacity in a communication system, comprising one or more processors configured to:

transmit a reservation request for a subscriber short address, and a minimum number of requested slots for data transmission on a random access channel to a radio frequency (RF) site device at an RF site wherein the reservation request includes a subscriber long address for identifying the subscriber unit;

receive a subscriber short address assignment for identifying the respective subscriber unit on a RF site channel;

receive a short address transmission schedule on a schedule channel;

determine that the assigned subscriber short address is listed in the short address transmission schedule and the one or more slots to transmit data by the subscriber unit corresponding to the assigned subscriber short address;

transmit data from the subscriber unit to the RF site during the one or more determined time slots;

receive a notification, from the RF site device, that a current number of slots and/or a number of attempts to transmit in assigned slots by the subscriber unit have exceeded a maximum limit of reserved slot attempts and that the assigned subscriber short address has been reassigned to a set of unallocated subscriber short addresses; and responsive to receiving the notification, refrain from further transmitting data from the subscriber unit to the RF site using the assigned subscriber short address.

12. The device of claim 11, wherein the device is further configured to:

set a wait timer to receive the subscriber short address on the RF site channel;

determine whether the wait timer to receive the subscriber short address has expired;

retransmit the reservation request for a short address, and a minimum number of slots for data transmission on the random access channel to the RF site from the subscriber unit.

13. The device of claim 11, wherein the device is further configured to:

generate an additional reservation request based on the data transmission;

transmit the additional reservation request for a short address on a reservation channel, the additional reservation request includes a number of slots for the data transmission;

receive an acknowledgement of the additional reservation request.

* * * * *